United States Patent [19]

Fourré et al.

[11] Patent Number: 4,520,482
[45] Date of Patent: May 28, 1985

[54] SAFETY CONTROLLER

[75] Inventors: Rémy Fourré, Les Ulis; Bruno de Langre, Paris, both of France

[73] Assignee: Societe d'Etudes Et Conseils A E R O, France

[21] Appl. No.: 416,620

[22] Filed: Sep. 10, 1982

[30] Foreign Application Priority Data

Sep. 14, 1981 [FR] France ................. 81 17338

[51] Int. Cl.³ ............................. G06F 11/16
[52] U.S. Cl. ................................ 371/68; 364/184; 371/25
[58] Field of Search ............. 371/68, 25; 364/184, 364/187

[56] References Cited

U.S. PATENT DOCUMENTS 3,509,532  4/1970  Vande Wege ............. 371/68 X
4,096,989  6/1978  Tawfik ....................... 371/68
4,096,990  6/1978  Strelow ...................... 371/68
4,251,873  2/1981  Joby .......................... 371/68 X
4,313,199  1/1982  Aichelmann, Jr. et al. ...... 371/25
4,363,124  12/1982 Aichelmann, Jr. ............. 371/25
4,435,806  3/1984  Segers et al. ................ 371/25

Primary Examiner—Charles E. Atkinson
Attorney, Agent, or Firm—Schiller & Pandiscio

[57] ABSTRACT

A safety controller comprises a comparator and two identical subcontrollers operating on the same input signals. The comparator provides error detection by comparing the outputs of the two subcontrollers. Each subcontroller includes combinational devices and memory registers for providing exhaustive testing of the registers and of the truth tables of the combinational devices of each of the subcontrollers. Controllers of the present invention are particularly useful as railway safety devices.

4 Claims, 4 Drawing Figures

FIG_1

SAFETY CONTROLLER

The present invention relates to a process for designing logic and digital "safety" controllers comprising a system for detecting errors by means of comparison between two identical sub-controllers operating on the same input signals. It also relates to a controller built in accordance with the process. More precisely, the invention consists of a layout of combinational devices and of memory registers for each of the sub-controllers that allows exhaustive testing of the registers and of the truth tables of the combinational devices of each of the sub-controllers.

For better comprehension of the invention, a few definitions should first be given:

Fault (state of): a definitive modification of a component that prevents it from performing completely its normal function. A fault of a combinational circuit leads to a modification of its truth table.

Single fault: the occurrence of one fault on one physical component of the safety controller (for example, a register or a combinational device designed as a PROM).

Sequential fault: a fault of a combinational device or of a register by which its output signals become combinational functions of several successive input signals. An application of the invention which is the subject of this application will apply to detection of sequential faults that introduce dependency on two successive inputs.

Latent fault: a fault that has ot yet caused an error, that is, an abnormal binary state of an output line of the component as fault.

"Safety": said of a device in which every error can be detected, or is not dangerous for the system controlled.

"Dynamization" of a component: the act of causing to be described all the possible binary states at the input wires of a component in order to explore its whole truth table. A "safety" controller detects the presence of an error by comparison of the output of two sub-controllers. Detection is therefore only possible if the two sub-controllers do not commit the same error simultaneously.

However, if the fault of a sub-controller remains latent for some time, the probability that the second sub-controller may be affected by the same fault causing the same error cannot be neglected.

Consequently, the truth tables of the logic circuits must be checked by systematically imposing on them all the possible input signals in order to cause rapid appearance of the modifications of the truth tables.

The object of this invention is therefore a process that periodically causes the combinational devices and registers of a sub-controller to operate on batches of test bits that systematically describe all the logic states of their inputs. For this reason, each of the sub-controllers has a looped structure, consisting of several blocks of registers and of one or more blocks of combinational devices, such that each block of combinational devices only operates on one block of registers or of combinational devices and that each block of registers is only fed from one block of registers or of combinational devices.

The registers and combinational devices are controlled by the same clock signal which therefore causes shifting of the contents of the blocks of registers, it being possible to modify the contents when one or more blocks of combinational devices are inserted between two successive blocks of registers. One or more input devices moreover provide for selecting, on certain input wires of certain bllocks of registers or combinational devices, between the signal from the preceding block and an outside signal on which the sub-controller must operate.

Because the sets of bits contained in the register blocks are separated, in accordance with the looped structure of the sub-controller, the input devices may be synchronized so that one or more sets of bits circulate in the loop without ever being modified by the input devices. These bits are called "test bits".

The functions provided by the combinational devices and the links between combinational devices and registers are selected so that it is possible, firstly, to carry out the desired sequential function on the input signals and, secondly, to "dynamize" each combinational device and each register by the successive states of the test bits.

Initially, the test bits are identical on the two subcontrollers, and they remain identical as long as none of the subcontrollers incurs any fault.

A comparator facility is placed between the two sub-controllers. This comparator facility receives the input signals of the combinational devices as well as, possibly, the signals taken at the input of certain blocks of registers, and detects any error caused by a single fault of one of the sub-controllers, either in the process bits, or during a dynamization step, by the test bits of the faulty component.

Several forms of application of the invention are described below as examples and refer to the appended drawings in which.

Figure 1:
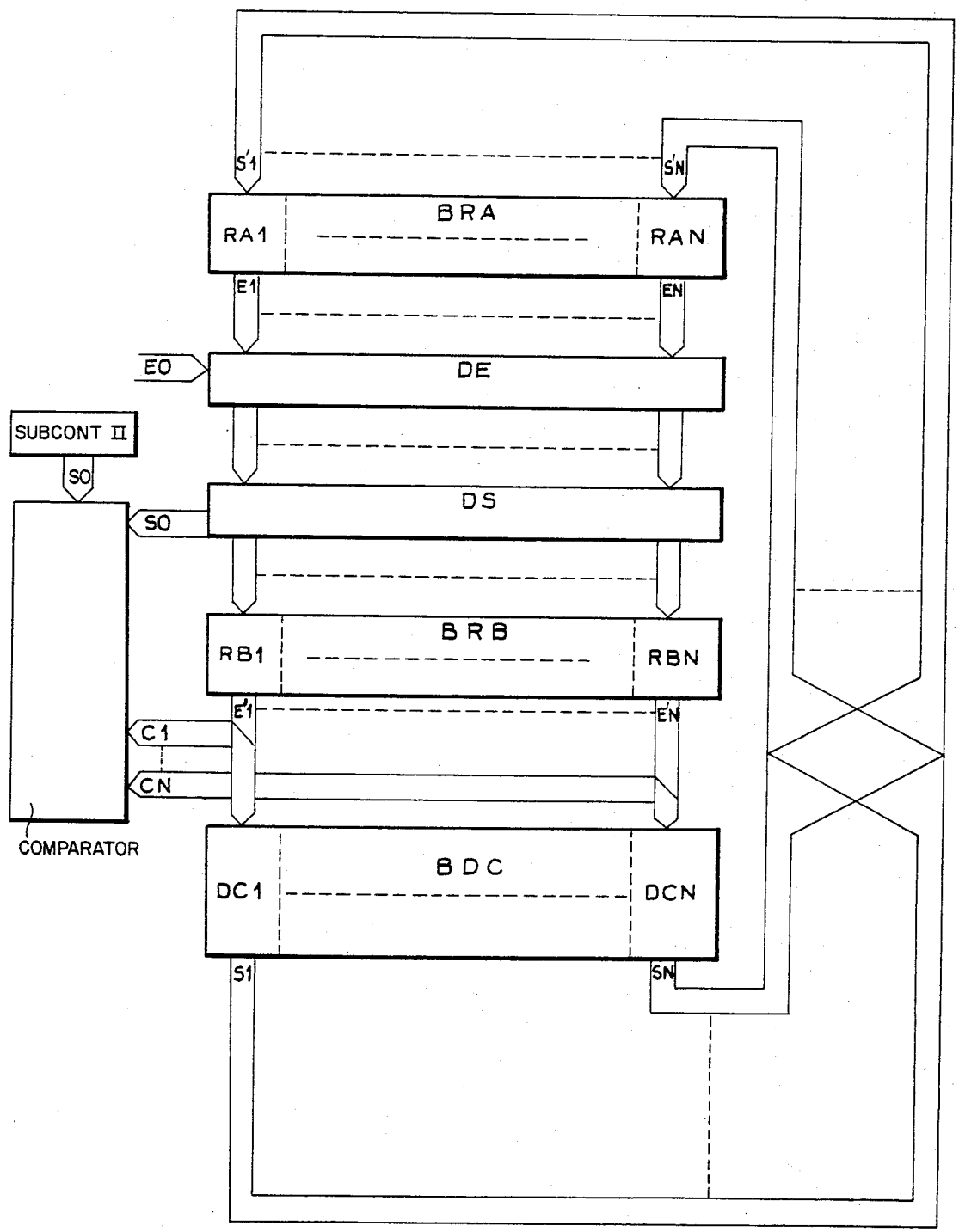
FIG. 1 illustrates schematically the principle of the invention applied to two blocks of registers and to one block of combinational devices.

FIG. 1 illustrates the principle of the invention applied to a sub-controller consisting of two blocks, BRA and BRB, with N registers each, one block BDC with N combinational devices DCI . . . DCN, in parallel, and input and output devices DE and DS, respectively provided with an input EO and an output SO. Of course, the complete safety controller comprises a second subcontroller identical to that illustrated here.

The sets of output wires S1 . . . SN of the combinational devices DC1 . . . DCN are mixed to form sets of input wires, respectively S'1 . . . S'N of registers RA1. . . RAN of the first block. S1 and S'1, S2 and S'2 , . . . SN and S'N have the same number of wires respectively.

The sets of wires E1 . . . EN transmit the respective contents of registers RA1 . . . RAN of BRA to registers RB1 . . . RBN of BRB. Input devices DE provides selection, on certain wires, of sets E1 . . . EN, between the signal from BRA and an outside signal applied to input EO and constituting an input of the process. Output device DS is designed for reading at SO of those wires of sets E1 . . . EN that carry the process results.

Sets of wires E'1 to E'N transmit to DC1 . . . DCN the respective contents of registers RB1 . . . RBN.

Sets of E'1 . . . E'N also lead to a device which is not illustrated and that compares the signals of the two sub-controllers, by means of set of wires C1 . . . CN.

The sub-controller, in accordance with the invention, therefore forms a loop in which the combinational devices DC1 . . . DCN, which may be different from each other, execute invariable logic operations on two separate sets of bits. The contents of BRA and BRB are never combined.

This property is used to cause the registers and the combinational devices to operate alternately on the process bits and the test bits. During one clock cycle, either BRA contains a set of batches of process bits and BRB a set of batches of test bits, or BRA contains a set of batches of test bits and BRB a set of batches of process bits, and the contents of BRA and BRB shift from one cycle to the other.

When BRA contains process bits, certain of them are read and/or modified at DS and DE, and the batches are loaded in BRB, while the test bits contained in BRB are loaded in DC1 . . . DCN and the results loaded in BRA.

Devices DE and DS operate during one clock cycle of two, when BRA contains process bits.

Devices DC1 . . . DCN and register blocks BRA and BRB thus operate alternatively on batches of test bits internal to the sub-controller and on batches of process bits that come partially from the outside through input EO of DE.

Reading of E'1 . . . E'N by the comparison device provides detection by comparison with the other sub-controller of any combinational error in a combinational device of BDC, any error in a register of BRA and BRB and any erroneous or unsynchronized writing in DE, provided that the other sub-controller is not faulty.

The separation of the batches of bits between the cascades (RA1, RBI, DCI) . . . (RA2, RB2, DC2), . . . (RAN, RBN, DCN) is a preferential method of implementing the invention that provides a means of improving the simplicity and the safety of the comparison device by minimizing the number of batches affected by the fault of a component.

The breakdown of the logic function into several sub-functions distributed between DC1 . . . DCN and the transfers between combinational devices by recombination of wires between S1 . . . SN to form S'1 . . . S'N, enable very complex calculations to be performed very rapidly (for example, real-time digital filtering).

Judicious choice of the recombination of wires of S1 . . . SN enables the graphs (E'1) × (S'1) . . . (E'N) × (S'N) to be rendered bijective, although graphs (E'1) × (S1) . . . (E'N) × (SN) are generally subjective.

This bijectivity is necessary so that the batches of test bits can successively describe all the logic states of the inputs of the registers and of the combinational devices.

This advantageous choice of devices DC1 . . . DCN and of wire combinations makes use of calculation methods based on Pétri networks.

Figure 2:
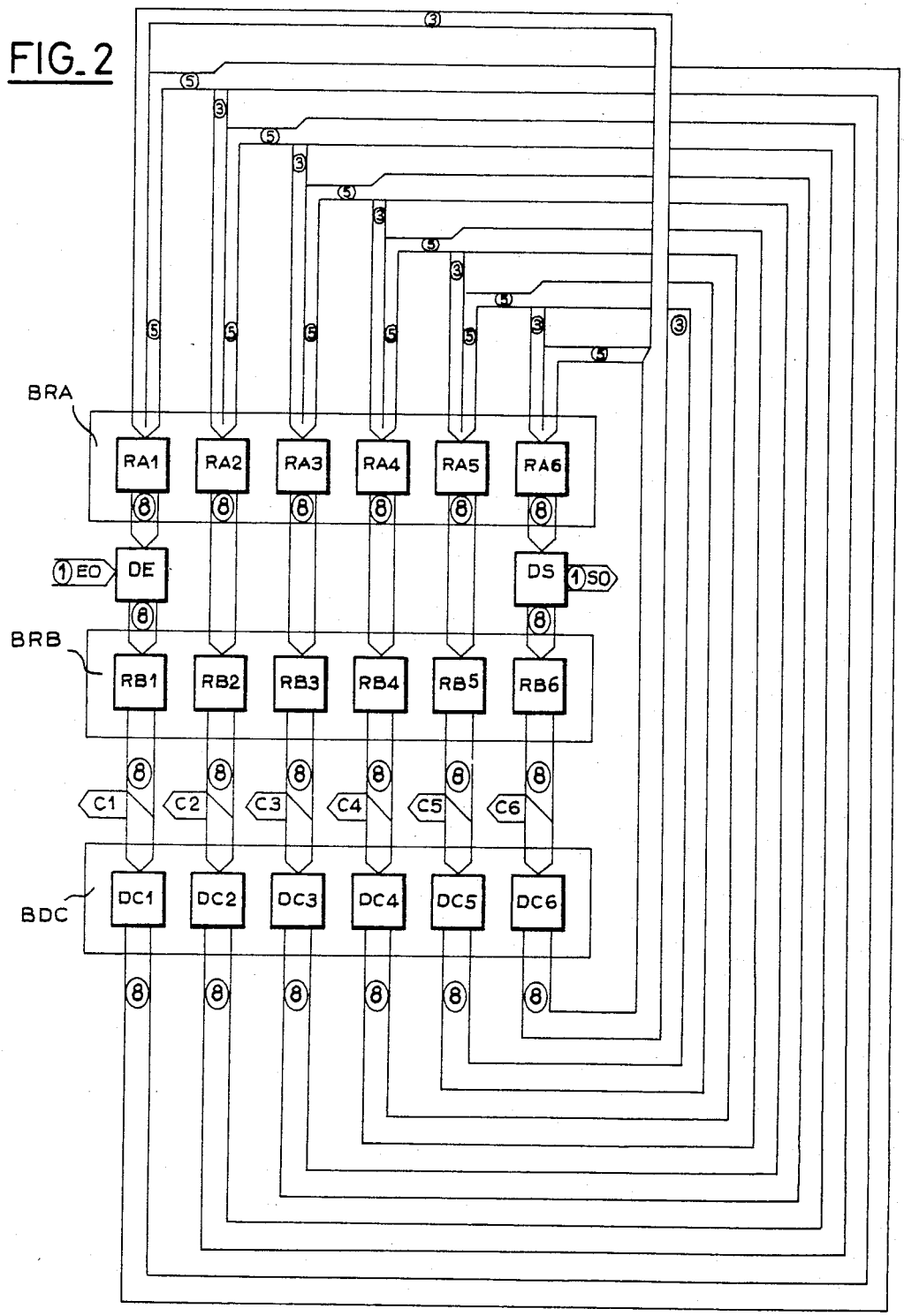
FIG. 2 illustrates an application of the invention to a digital filter.

FIG. 2 illustrates an example of a practical application of the invention to a 2,000 Hz frequency modulation filter, that can be used for example in railway safety techniques.

The controller receives a signal at 1,990 Hz or 2,010 Hz, samples at 500 kHz, at its input EO.

Signal EO is considered as being 1,990 Hz when the controller counts 251 or 252 measurements during the interval between two consecutive rising fronts and as 2,010 Hz when the controller counts 248 or 249 measurements during the interval between two consecutive rising fronts.

Outut SO turns to a high lvel after three intervals consecutive to 251 or 252 measurements and to a low level after three intervals consecutive to 248 or 249 measurements. SO remains set at its last value in all other cases.

Each of the two sub-controllers consists of two blocks of 6 8-bit registers, BRA and BRB, and of a block of 6 8-bit combinational devices, BDC. Each combinational device may be, for example, a 256—8 bit word read-only memory. The 8 bit output is read in the memory at the address equal to the 8 bit input. Typical values of the contents of the six read-only memories used in the present example are listed in hexadecimal form in table No. 1 below. One register of BRA is read by one only register of BRB and one register of BRB is read by one only combinational device of BDC.

There are therefore 6 modules formed of two registers and one combinational device.

Each module (i) has 8 incoming lines (inputs of RA (i)) and 8 outgoing lines (outputs of DC (i)).

The five output lines of DC (i) of low order are reinjected into the five lines of low order at the input of the same module at RA (i).

The three output lines of DC (i) of high order are injected into the three high-order lines at the input of the following module at RA (i+1).

The six modules are laid out in ring form which means that the three high-order outputs of DC6 are reinjected into the three high-order inputs of RA1.

EO is recopied by DE on the low-order line at the input of RB1 when BRA contains process bits that are read by BRB.

SO is read by DS on the low-order line of the sixth module when BRA contains process bits which are read by BRB.

The initial 8 bit values to be loaded in the block of registers that initially contain the process bits are: 01, 00, 00, 00, 04, 00

The initial 8 bit values to be loaded into the block of registers that initially contain the test bits are, for example: 40, 8A, 2C, 99, 64, 96

The successive 8 bit values taken by the test bits in each of the 6 modules are listed in table No. 2 below. Each modules has 256 possible values, which test the components.

A method of comparison which is not illustrated applies to the 6 batches of 8 bits taken at C1 to C6 in the two sub-controllers. The structure in the form of separate modules enables 11 batches to be made up, from the 6 batches, each containing one erroneous bit at most, which facilitates the construction of a safety comparator device that makes use of a coding system based on parity of batches.

Table 3 below illustrates the bits that constitute these 11 batches.

TABLE NO. 3

| | BATCH NO. | | | | | | | | | | |
|---|---|---|---|---|---|---|---|---|---|---|---|
| | 10 | 9 | 8 | 7 | 6 | 5 | 4 | 3 | 2 | 1 | 0 |
| MODULE N° 1 | 7 | | 6 | | 5 | | 4 | 3 | 2 | 1 | 0 |
| 2 | | 7 | | 6 | | 5 | 4 | 3 | 2 | 1 | 0 |
| 3 | 7 | | 6 | | 5 | | 4 | 3 | 2 | 1 | 0 |
| 4 | | 7 | | 6 | | 5 | 4 | 3 | 2 | 1 | 0 |
| 5 | 7 | | 6 | | 5 | | 4 | 3 | 2 | 1 | 0 |

TABLE NO. 3-continued

| BATCH NO. | | | | | | | | | | |
|---|---|---|---|---|---|---|---|---|---|---|
| 10 | 9 | 8 | 7 | 6 | 5 | 4 | 3 | 2 | 1 | 0 |
| | 6 | 7 | 6 | | 5 | 4 | 3 | 2 | 1 | 0 |

This example shows that it is effectively possible to determine the combinational functions having the properties used by the invention in the case of a process of a certain complexity.

TABLE 1

"INPUT - OUTPUT MATRICES OF COMBINATIONAL UNITS. HEXADECIMAL CONTENTS OF THE READ-ONLY MEMORIES."

MODULE N° 1

| | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 0. | 07 | 09 | 07 | 09 | 61 | 09 | 4B | 4D | 61 | 4D | 4F | 51 | 61 | 51 | 13 | 15 |
| 1. | 61 | 15 | 37 | 39 | 63 | 39 | 3B | 3D | 63 | 3D | 03 | 05 | 63 | 05 | 00 | 00 |
| 2. | 00 | 00 | 02 | 02 | 02 | 02 | 04 | 04 | 04 | 04 | 05 | 05 | 06 | 06 | 06 | 06 |
| 3. | 07 | 07 | 08 | 28 | 28 | 28 | 29 | 2A | 2A | 2A | 2A | 2B | 2B | 2B | 2C | 2C |
| 4. | 2C | 2C | 2D | 2D | 2E | 2E | 2E | 2E | 2F | 2F | 2F | 30 | 30 | 50 | 50 | 51 |
| 5. | 51 | 52 | 52 | 52 | 52 | 53 | 53 | 53 | 54 | 54 | 54 | 55 | 55 | 56 | 56 |
| 6. | 56 | 56 | 57 | 57 | 57 | 58 | 58 | 78 | 78 | 79 | 79 | 7A | 7A | 7A | 7A | 7B |
| 7. | 7B | 7B | 7C | 7C | 7C | 7C | 7D | 7D | 7E | 7E | 7E | 7E | 7F | 7F | 7F | 7F |
| 8. | 85 | 86 | 89 | AA | BD | DB | FD | 80 | A0 | C1 | E2 | C6 | 84 | CC | 90 | 81 |
| 9. | 88 | BD | AE | C3 | F7 | AB | 87 | 90 | 91 | B5 | F7 | FB | CA | C5 | 89 | 8E |
| A. | F4 | B6 | B5 | CE | F8 | CB | DE | B0 | 81 | B3 | 87 | FF | A8 | A3 | C4 | C7 |
| B. | A9 | 8C | CF | 93 | 99 | C1 | AB | D2 | D6 | 98 | 9C | FE | E7 | AB | AF |
| C. | ED | DA | D6 | AA | F9 | FC | FF | 92 | 85 | 95 | B8 | C0 | F1 | B9 | E5 | DC |
| D. | 8A | AD | D1 | B5 | BA | FD | DF | F2 | 93 | C3 | B9 | BD | 83 | C8 | CC | D0 |
| E. | EE | FE | F7 | EF | FA | CC | 80 | D4 | B4 | 97 | 82 | F8 | E2 | D3 | A6 | F3 |
| F. | 8B | FF | F2 | D6 | DB | BE | FC | A2 | 94 | E4 | DA | A6 | A4 | A9 | ED | F1 |

MODULE N° 2

| | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 0. | 00 | 00 | 00 | 01 | 04 | 04 | 06 | 06 | 08 | 08 | 0A | 0A | 0C | 0C | 01 | 02 |
| 1. | 02 | 02 | 22 | 24 | 25 | 25 | 26 | 27 | 27 | 28 | 29 | 29 | 2A | 2B | 2B | 2C |
| 2. | 03 | 03 | 03 | 25 | 05 | 27 | 07 | 29 | 09 | 2B | 0B | 2D | 2D | 23 | 2D | 2D |
| 3. | 31 | 31 | 32 | 32 | 32 | 32 | 33 | 33 | 33 | 53 | 54 | 54 | 54 | 54 | 55 | 55 |
| 4. | 00 | 01 | 01 | 55 | 04 | 55 | 06 | 56 | 08 | 56 | 0A | 56 | 4C | 56 | 57 | 57 |
| 5. | 57 | 57 | 58 | 58 | 58 | 58 | 59 | 59 | 59 | 59 | 5A | 5A | 5A | 5A | 5B | 5B |
| 6. | 6E | 6E | 6E | 6E | 6F | 6F | 6F | 6F | 70 | 70 | 70 | 70 | 71 | 71 | 7B | 7B |
| 7. | 7C | 7C | 7C | 7C | 7D | 7D | 7D | 7D | 7E | 7E | 7E | 7E | 7F | 7F | 7F | 7F |
| 8. | 92 | B5 | A9 | DB | 97 | AD | 83 | 94 | A2 | 92 | 93 | 8D | 9E | 94 | 9F | 86 |
| 9. | 87 | CB | 9D | 90 | B1 | 81 | A4 | 81 | 85 | 87 | 9D | 9E | 8F | 96 | 9C | 87 |
| A. | B3 | B9 | 8E | CF | BD | D3 | DB | F6 | B7 | A4 | 85 | A3 | D9 | A5 | B6 | AA |
| B. | A8 | EC | A8 | E3 | C0 | 82 | A5 | A2 | A8 | AB | AB | BF | B0 | B7 | BE | A8 |
| C. | D4 | DB | AF | F0 | DC | 95 | EE | D4 | D8 | F7 | F9 | BA | A7 | F9 | DA | CE |
| D. | C9 | C0 | CC | 80 | E1 | FC | C6 | C3 | C9 | CC | CF | CD | DD | D8 | DF | C9 |
| E. | B8 | ED | F0 | F1 | D1 | D2 | F3 | F5 | D6 | F8 | FA | 95 | FB | 92 | FE | FC |
| F. | EA | E2 | B1 | A4 | CC | DF | E0 | E4 | EA | E6 | EB | EE | F1 | FA | E6 | EA |

MODULE N° 3

| | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 0. | 00 | 00 | 00 | 01 | 04 | 04 | 06 | 06 | 08 | 08 | 0A | 0A | 0C | 0C | 01 | 02 |
| 1. | 02 | 02 | 22 | 24 | 25 | 25 | 26 | 27 | 27 | 28 | 29 | 29 | 2A | 2B | 2B | 2C |
| 2. | 03 | 03 | 03 | 25 | 05 | 27 | 07 | 29 | 09 | 2B | 0B | 2D | 2D | 23 | 2D | 2D |
| 3. | 31 | 31 | 32 | 32 | 32 | 32 | 33 | 33 | 33 | 53 | 54 | 54 | 54 | 54 | 55 | 55 |
| 4. | 00 | 01 | 01 | 55 | 04 | 55 | 06 | 56 | 08 | 56 | 0A | 56 | 4C | 56 | 57 | 57 |
| 5. | 57 | 57 | 58 | 58 | 58 | 58 | 59 | 59 | 59 | 59 | 5A | 5A | 5A | 5A | 5B | 5B |
| 6. | 6E | 6E | 6E | 6E | 6F | 6F | 6F | 6F | 70 | 70 | 70 | 70 | 71 | 71 | 7B | 7B |
| 7. | 7C | 7C | 7C | 7C | 7D | 7D | 7D | 7D | 7E | 7E | 7E | 7E | 7F | 7F | 7F | 7F |
| 8. | 92 | 90 | A5 | B5 | B7 | 9E | 81 | 8E | A7 | 9B | 9C | A0 | E9 | 9A | DF | BA |
| 9. | 90 | A2 | A4 | B9 | 9D | 80 | 81 | AD | A1 | 87 | 8D | AE | 96 | 9D | 85 | 89 |
| A. | B3 | F5 | E7 | 89 | 98 | AD | B9 | AF | 9D | C4 | C1 | C2 | EB | C3 | 96 | CA |
| B. | BB | FA | C5 | F1 | A8 | A4 | A8 | CE | D0 | B3 | AB | EF | B7 | BE | A7 | BE |
| C. | D4 | BF | E8 | 83 | AC | F1 | DB | 92 | DC | B4 | E4 | D6 | B7 | F9 | DA | EE |
| D. | D1 | 92 | FB | C0 | CC | C5 | CA | E0 | F1 | D4 | C6 | DF | C8 | CA |
| E. | FC | F9 | A9 | C6 | CA | EB | ED | D3 | D0 | D5 | 96 | F7 | D8 | F8 | FE | 8C |
| F. | FC | B3 | 82 | E2 | 83 | E6 | 8C | 8F | 92 | E6 | EB | F5 | F8 | E3 | FD | FF |

MODULE n° 4

| | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 0. | 00 | 00 | 00 | 00 | 03 | 04 | 04 | 04 | 04 | 05 | 05 | 05 | 05 | 06 | 06 | 06 |
| 1. | 06 | 07 | 07 | 07 | 07 | 08 | 08 | 08 | 28 | 29 | 29 | 29 | 29 | 2A | 2A | 2A |
| 2. | 01 | 01 | 01 | 01 | 2A | 2B | 2B | 2B | 2B | 2C | 2C | 2C | 2C | 2D | 2D | 2D |
| 3. | 2D | 2E | 2E | 2E | 2E | 2F | 2F | 2F | 2F | 30 | 30 | 50 | 50 | 51 | 51 | 51 |
| 4. | 02 | 02 | 02 | 02 | 51 | 52 | 52 | 52 | 52 | 53 | 53 | 53 | 53 | 54 | 54 | 54 |
| 5. | 54 | 55 | 55 | 55 | 55 | 56 | 56 | 56 | 56 | 57 | 57 | 57 | 57 | 58 | 78 | 78 |
| 6. | 63 | 23 | 43 | 78 | 79 | 79 | 79 | 79 | 7A | 7A | 7A | 7A | 7B | 7B | 7B | 7B |
| 7. | 7C | 7C | 7C | 7C | 7D | 7D | 7D | 7E | 7E | 7E | 7E | 7F | 7F | 7F | 7F |
| 8. | B2 | 9E | BD | F6 | B8 | BD | E4 | E8 | 89 | D0 | 81 | EE | 82 | 81 | C2 | A3 |
| 9. | BB | A3 | 80 | C1 | CE | B2 | A0 | 87 | 8E | 8D | 92 | D6 | 9A | C4 | 88 | 8A |
| A. | 93 | EB | 88 | 97 | B9 | FF | C5 | A9 | AD | EC | A7 | AF | D4 | 83 | B6 | D7 |
| B. | E0 | E8 | C4 | E9 | EF | D3 | C1 | AB | 8F | D1 | 93 | D7 | BB | E5 | A9 | BE |
| C. | 94 | FA | EC | 9A | 9B | DC | A6 | D8 | F3 | CA | 90 | F6 | 83 | C4 | E5 |
| D. | 80 | 82 | A5 | AC | F0 | F4 | E2 | CF | BF | CA | B4 | F8 | BD | A6 | DE | DF |
| E. | 95 | EC | 91 | FE | DC | BC | C7 | CA | F9 | F7 | 8D | D1 | F8 | B9 | 9A | 9B |
| F. | C2 | AB | C6 | CD | 91 | 95 | E6 | EB | B0 | EE | B5 | F9 | DC | C7 | FD | FF |

MODULE n° 5

| | .0 | .1 | .2 | .3 | .4 | .5 | .6 | .7 | .8 | .9 | .A | .B | .C | .D | .E | .F |
|---|---|---|---|---|---|---|---|---|---|---|---|---|---|---|---|---|
| 0. | 00 | 01 | 02 | 03 | 04 | 03 | 04 | 07 | 04 | 07 | 04 | 07 | 0C | 07 | 0C | 0F |

4,520,482

TABLE 1-continued
"INPUT - OUTPUT MATRICES OF COMBINATIONAL UNITS. HEXADECIMAL CONTENTS OF THE READ-ONLY MEMORIES."

|  |  |  |  |  |  |  |  |  |  |  |  |  |  |  |  |  |
|---|---|---|---|---|---|---|---|---|---|---|---|---|---|---|---|---|
|  | 1. | 10 | 11 | 02 | 0F | 02 | 0F | 01 | 02 | 0A | 00 | 0F | 10 | 14 | 15 | 16 | 16 |
|  | 2. | 2C | 33 | 2C | 33 | 2E | 33 | 2E | 33 | 2E | 35 | 2E | 35 | 30 | 35 | 30 | 31 |
|  | 3. | 31 | 31 | 36 | 36 | 37 | 37 | 37 | 37 | 38 | 38 | 38 | 38 | 39 | 39 | 39 | 39 |
|  | 4. | 40 | 40 | 40 | 41 | 52 | 41 | 52 | 43 | 52 | 43 | 52 | 45 | 54 | 45 | 54 | 45 |
|  | 5. | 54 | 45 | 5A | 5A | 5A | 5A | 5B | 5B | 5B | 5B | 5C | 5C | 5C | 5C | 5D | 5D |
|  | 6. | 66 | 69 | 66 | 69 | 66 | 69 | 66 | 69 | 68 | 6B | 68 | 6B | 68 | 6B | 68 | 6B |
|  | 7. | 6A | 6D | 6A | 6D | 6A | 6D | 7D | 7D | 7E | 7E | 7E | 7E | 7F | 7F | 7F | 7F |
|  | 8. | 80 | 93 | B4 | D5 | F7 | 80 | 8D | DB | 92 | AF | 9A | B3 | DA | 85 | D2 | A9 |
|  | 9. | 99 | A1 | A0 | EF | F1 | 9D | A8 | DC | DD | C1 | F1 | F5 | 87 | 8E | 87 | 8A |
|  | A. | 92 | 83 | A6 | 98 | B9 | CC | D0 | 9D | D4 | A6 | DD | F5 | FC | A1 | 94 | C3 |
|  | B. | CD | DB | E5 | B1 | AB | 9F | 9A | FF | FB | C7 | 92 | B6 | AB | C5 | A8 | AB |
|  | C. | A2 | C4 | E8 | 86 | FC | 8E | CA | DE | 96 | F1 | 83 | B7 | A2 | E2 | D6 | C7 |
|  | D. | E4 | FE | A0 | F3 | ED | F7 | A2 | 9B | 90 | EA | B3 | D7 | CF | E6 | DE | DF |
|  | E. | FE | AA | CB | C8 | BF | D0 | B6 | 81 | D8 | EE | EC | F9 | 90 | A4 | B8 | 89 |
|  | F. | FA | 85 | E9 | B5 | AF | D9 | CC | A3 | BC | EE | D4 | F8 | 84 | ED | E9 | EC |
| MODULE n° 6 | 0. | 00 | 01 | 01 | 01 | 01 | 02 | 02 | 02 | 02 | 03 | 03 | 03 | 03 | 04 | 04 | 04 |
|  | 1. | 04 | 05 | 05 | 05 | 05 | 06 | 06 | 06 | 06 | 07 | 07 | 07 | 07 | 2B | 28 | 28 |
|  | 2. | 00 | 28 | 29 | 29 | 29 | 29 | 2A | 2A | 2A | 2A | 2B | 2B | 2B | 2B | 2C | 2C |
|  | 3. | 2C | 2C | 2D | 2D | 2D | 2D | 2E | 2E | 2E | 2F | 2F | 2F | 2F | 50 | 50 |
|  | 4. | 00 | 50 | 50 | 51 | 51 | 51 | 51 | 52 | 52 | 52 | 52 | 53 | 53 | 53 | 53 | 54 |
|  | 5. | 54 | 54 | 54 | 55 | 55 | 55 | 55 | 56 | 56 | 56 | 56 | 57 | 57 | 57 | 57 | 78 |
|  | 6. | 00 | 78 | 78 | 78 | 79 | 79 | 79 | 79 | 7A | 7A | 7A | 7A | 7B | 7B | 7B | 7B |
|  | 7. | 7C | 7C | 7C | 7C | 7D | 7D | 7D | 7D | 7E | 7E | 7E | 7E | 7F | 7F | 7F | 7F |
|  | 8. | B2 | F3 | D8 | FD | E1 | C5 | E9 | 85 | 9F | D0 | F4 | 9D | B9 | FA | DB | D0 |
|  | 9. | B0 | A3 | 86 | C0 | AE | B2 | 84 | A7 | 8E | 8D | 92 | D6 | DA | E3 | A7 | AA |
|  | A. | F6 | D4 | D9 | 9F | C2 | E6 | CA | 89 | 88 | F1 | 95 | B8 | 81 | 82 | E3 | DC |
|  | B. | A2 | C0 | A0 | AB | CF | D3 | F6 | 8B | 86 | AF | B3 | F7 | 81 | 84 | C8 | CB |
|  | C. | FA | B5 | DB | 9E | E3 | C7 | EB | AD | 8C | B2 | D6 | D9 | BB | 9C | 9D | E1 |
|  | D. | C7 | E4 | E8 | CC | F0 | F4 | D7 | 8F | AA | D0 | 94 | 98 | BD | A5 | FE | FF |
|  | E. | FE | F7 | 9C | BC | E4 | A8 | EC | D1 | AF | D3 | 97 | FA | DE | BF | BB | AE |
|  | F. | 8A | A5 | A9 | ED | 91 | D5 | F8 | ED | AE | F1 | B5 | B9 | C2 | 86 | 89 | CC |

TABLE 2

SUCCESSIVE 256 STATES (BY COLUMNS OF 64) OF THE 8 BIT WORDS TESTING EACH OF THE SIX MODULES DURING A CYCLE

| 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 |
|---|---|---|---|---|---|---|---|---|---|---|---|---|---|---|---|---|---|---|---|---|---|---|---|
| 40 | 8A | 2C | 99 | 64 | 96 | 3A | D5 | 6E | F9 | 63 | AE | 79 | A1 | 06 | F2 | 47 | 9E | 13 | 97 | 4E | 83 | 22 | A4 |
| 8C | 33 | 8D | 2D | 86 | 64 | EA | 2D | DB | 6E | E9 | 63 | BE | 79 | A6 | 06 | C3 | 47 | D9 | 21 | 97 | 4E | EC | 22 |
| 64 | 92 | 3A | 8D | 2D | 99 | 62 | 83 | 3A | DB | 6E | F8 | 4B | BE | 79 | A4 | 06 | 92 | 23 | C3 | 0D | B4 | 50 | 89 |
| 97 | 50 | 94 | 41 | 95 | 20 | B7 | 5B | D2 | 38 | E8 | 6E | 90 | 3E | BE | 79 | A4 | 06 | C2 | C2 | EC | 0F | F4 | 50 |
| 30 | 9A | 5D | 82 | 1D | 8B | 6F | DA | 5B | EF | 38 | D3 | 08 | 95 | 47 | BE | 79 | A2 | 56 | 10 | 18 | C6 | 0F | B4 |
| 87 | 1D | 9A | 5D | 85 | 1D | 93 | 6F | DA | 5B | E8 | 38 | C1 | 61 | 96 | 49 | BE | 79 | D3 | 4F | A7 | 26 | AF | 0F |
| 20 | 6B | 2D | 98 | 5F | 85 | 3B | F8 | 6F | D7 | 5D | CE | 7A | CE | 61 | 93 | 48 | BE | 15 | B7 | 4F | A5 | 23 | C4 |
| 80 | CD | 83 | 2E | 9D | 5F | 65 | 2E | 6F | FB | DC | 5D | DE | 7A | CE | 61 | D2 | 48 | F9 | 22 | B7 | 4F | B3 | 23 |
| 65 | 8C | 15 | AD | 2E | 98 | 46 | CD | FB | 6F | 6F | D7 | 4C | DE | 7A | CE | 20 | B2 | 24 | E3 | 0E | D4 | 51 | A9 |
| 98 | 5E | 85 | 23 | 90 | 2E | 8E | 39 | 35 | FB | EB | 6F | B0 | 3F | DE | 7A | 8C | 20 | E2 | 11 | E1 | 10 | E5 | 51 |
| 31 | 98 | 5E | 81 | 19 | 8C | 70 | 93 | F2 | 39 | 39 | FB | 09 | B5 | 3F | DE | 7A | 48 | 57 | E2 | 19 | E6 | 10 | E5 |
| A7 | 1E | 9B | 5E | 8D | 19 | BB | 70 | 42 | 90 | B8 | 39 | ED | 42 | B5 | 1E | DE | B2 | F3 | 50 | E8 | 27 | D0 | 10 |
| 10 | A3 | 2E | B8 | 65 | 87 | 3C | 9C | 81 | 1B | 3B | EE | 7B | C1 | 42 | AA | 3E | C0 | 16 | D7 | 50 | CB | 24 | E4 |
| 81 | 63 | AD | 2F | 89 | 65 | AB | 2F | 70 | 89 | B8 | 33 | FE | 7B | 88 | 07 | B9 | DE | FB | 23 | D7 | 50 | 8E | 24 |
| 66 | 8E | 63 | CD | 2F | B9 | 3F | ED | 9C | 70 | 65 | 8F | 4D | FE | 07 | C6 | 07 | 3E | 26 | A5 | 20 | F4 | 52 | C9 |
| B8 | 5F | 8E | 63 | B9 | 2F | CC | 32 | 36 | 9C | 89 | 70 | D0 | 46 | C6 | 7B | 87 | D0 | A4 | 13 | C3 | 11 | 9A | 52 |
| 32 | 1F | 5F | D8 | 61 | AC | 71 | F2 | 39 | 3A | B3 | 9C | 0A | 86 | 7B | FE | FE | 07 | 58 | E4 | 23 | 87 | F1 | F4 |
| 88 | B8 | 5F | 2F | A9 | 61 | DB | 71 | B3 | 39 | F8 | 3A | CF | 43 | FE | 7B | 1D | C2 | 94 | 51 | C5 | 28 | 25 | 11 |
| 60 | 88 | BB | F8 | 66 | B8 | 3D | BC | 71 | E2 | 1C | F8 | 7C | D5 | 1D | 8B | 8B | 7B | 17 | F7 | 51 | E8 | F1 | 85 |
| 96 | 59 | 2F | 30 | B8 | 66 | CB | 30 | BC | 71 | 94 | 1C | ED | 7C | 8B | 40 | 40 | FE | DD | 24 | F7 | 51 | 25 | 25 |
| 67 | 99 | CD | ED | 30 | D9 | 72 | D1 | D3 | BC | 71 | E7 | 7E | 7C | 40 | E0 | E3 | 49 | 28 | C5 | 24 | 95 | D3 | E9 |
| D8 | 67 | 59 | 59 | B1 | 30 | C7 | 00 | 00 | 3B | AD | 71 | DF | 7E | E0 | 7C | 7C | D2 | C4 | 15 | C7 | 12 | 53 | 53 |
| 33 | 8F | 99 | 67 | 5B | CC | 72 | 72 | 00 | D0 | 80 | BC | 50 | DF | 7C | 9F | 9F | 08 | 59 | E5 | 52 | A7 | BA | 95 |
| A5 | 26 | 8F | 67 | 9C | 5B | 9C | DC | 72 | 00 | 00 | 3D | D1 | 50 | 9F | 4A | 4A | E2 | B4 | 52 | 98 | 29 | 12 | 12 |
| 41 | 87 | 1A | 8F | 67 | 97 | 4A | 3D | DC | 8A | A0 | 00 | 7F | D1 | 4A | B3 | F2 | 7C | 19 | 98 | 25 | 8C | A2 | A5 |
| AC | 34 | 89 | A2 | C9 | 67 | 8F | 94 | 46 | 40 | A0 | 72 | FF | 7F | B3 | 09 | 09 | 9F | FD | 25 | C7 | 52 | 26 | 26 |
| 68 | B2 | 3B | 68 | F9 | 31 | 01 | 01 | 01 | E2 | AA | DC | 4F | FF | 09 | 46 | A7 | 4A | 29 | A7 | 52 | B5 | AE | 8A |
| F8 | 68 | B4 | 42 | 31 | 9A | A9 | A0 | AD | 71 | 3D | 72 | B1 | 4F | 46 | B6 | BE | F2 | 5A | 16 | 98 | 29 | 54 | 54 |
| 34 | 90 | 68 | 9A | 1E | EC | 73 | 73 | 01 | BC | 99 | DC | 0C | B1 | B6 | 09 | 09 | 09 | D4 | E6 | 26 | 8C | DA | B5 |
| C8 | 27 | 30 | 32 | 96 | 1E | BC | FC | A0 | 3B | 01 | 30 | E1 | 0C | 09 | 7D | 7D | 83 | 1A | 53 | E7 | 52 | 13 | 13 |
| 82 | 89 | 90 | AE | 68 | A8 | 3E | 31 | 73 | D0 | 81 | CF | 7E | E1 | 7D | BF | BF | 7D | 2A | B8 | 53 | B5 | CF | C5 |
| 69 | 12 | 22 | 16 | B6 | 68 | EC | F1 | F1 | 8A | 73 | 01 | DF | 7E | BF | 3E | 4B | BF | 85 | 10 | B8 | 13 | 27 | 27 |
| 99 | 69 | A3 | 88 | 32 | 9A | 02 | 02 | 02 | 01 | 81 | 81 | 50 | DF | 4B | 7E | 4B | 4B | 5B | A2 | 10 | C7 | F3 | AA |
| E8 | B0 | 69 | 88 | B6 | 32 | E7 | AD | A0 | 81 | CD | 73 | 92 | 50 | 7E | 1F | 85 | 93 | 2B | 27 | A2 | 18 | 55 | 55 |
| 14 | 28 | B0 | 69 | 1A | 8D | 74 | 03 | 73 | 02 | 02 | 81 | 0E | 92 | 1F | CA | 40 | 40 | 25 | C9 | 27 | C8 | FA | D5 |
| 83 | A9 | 28 | BA | 8F | 69 | DC | AD | 38 | FC | 80 | CD | F1 | 0E | CA | 7F | 7F | E0 | 5C | C7 | 54 | 53 | 14 | 14 |
| 6A | 64 | A3 | 33 | 69 | BA | 04 | 04 | F3 | F0 | 02 | 02 | 7F | F1 | 7F | 3F | 4C | 7E | D5 | 52 | D8 | D5 | C2 | E5 |
| B9 | AF | 64 | CE | 88 | 33 | AF | 03 | 02 | 02 | C0 | DB | 51 | 7F | 3F | D9 | B4 | DF | 1D | 98 | 11 | 14 | 28 | 28 |
| 36 | 6A | AF | 64 | 69 | 8D | 03 | AD | 74 | 74 | 82 | 80 | 92 | 51 | D9 | 0A | 0B | 4B | A5 | C8 | A2 | E7 | CE | CA |
| 81 | CB | 6A | DA | D6 | AD | D7 | C0 | AD | 9D | 83 | 74 | 0E | 92 | 0A | E4 | E4 | 93 | 2B | 18 | 27 | 2A | 56 | 56 |
| B6 | 5A | A9 | 6A | C6 | 1A | 52 | 31 | 73 | 44 | 75 | 42 | 93 | 45 | 41 | 92 | B4 | 40 | 5C | C8 | C9 | AC | 9B | 29 |
| 63 | BA | 64 | 6A | A8 | A7 | B2 | 75 | BD | EO | AD | 90 | 63 | F5 | C1 | F1 | 4C | EO | D5 | 54 | 54 | 54 | 15 | D5 |
| 9A | 68 | AF | AD | 34 | 69 | 0F | BD | 3E | 75 | ED | 03 | 52 | 7F | 7F | FF | 7F | 7E | 1D | D8 | D8 | F5 | EF | 86 |
| 37 | CB | 65 | DA | 97 | 5C | F1 | 03 | 95 | BD | BD | 75 | 0F | FF | 1F | 3F | FF | DF | E5 | 09 | 11 | 15 | 29 | 29 |
| 86 | F0 | F0 | B7 | 6B | CD | 95 | D7 | AE | 3E | ED | BD | CF | CA | 8C | 3F | 4C | 0A | 2C | C8 | C2 | E8 | D5 | EA |
| 42 | EB | 1C | FA | 6B | 5C | 48 | DD | 76 | 45 | 92 | 44 | 95 | 19 | D6 | 4B | 5E | B3 | 86 | 56 | 56 | 20 | BB | 57 |
| 8D | 35 | 8A | 35 | AB | 6B | EF | 38 | DD | 76 | E6 | 60 | 48 | 3B | CA | 0C | A5 | 4D | CO | 0B | B9 | 56 | EE | 2A |

TABLE 2-continued

SUCCESSIVE 256 STATES (BY COLUMNS OF 64) OF THE 8 BIT WORDS TESTING EACH OF THE SIX MODULES DURING A CYCLE

| 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 |
|---|---|---|---|---|---|---|---|---|---|---|---|---|---|---|---|---|---|---|---|---|---|---|---|
| 6C | D2 | 3C | 8F | 35 | FA | 05 | F3 | 3F | DD | 76 | A0 | 53 | F4 | 44 | E5 | 0C | D3 | 2D | EA | 13 | E6 | 58 | A3 |
| BA | 6C | D4 | 43 | B7 | 35 | E9 | 04 | B5 | 46 | BD | 76 | D2 | 4C | C4 | 1C | AC | 0C | A6 | 1A | E4 | 21 | DB | 58 |
| 38 | 91 | 6C | C2 | 1F | ED | 77 | 84 | 04 | B2 | 45 | BD | 11 | CC | 4C | A9 | 3C | E3 | 5E | C9 | 2A | C1 | 17 | D6 |
| AA | 2B | D1 | 6C | F6 | 1F | BD | 77 | 84 | 04 | C1 | 45 | B5 | 07 | AC | 4C | F9 | 3C | D6 | 57 | EB | 1A | E2 | 17 |
| 27 | 8D | 32 | 9B | 6C | C8 | 47 | FD | 77 | A3 | 04 | D1 | 21 | C6 | 05 | F3 | 4E | EF | 1F | D0 | 57 | E9 | 23 | C6 |
| 84 | 14 | 92 | 36 | CB | 6C | EE | 3A | FD | 77 | 54 | 04 | A0 | 0E | EA | 0D | D4 | 4E | E0 | 0C | D9 | 57 | F5 | 23 |
| 6D | 35 | 24 | AF | 36 | 9B | 06 | 54 | 43 | FD | 77 | E1 | 54 | E1 | 16 | 86 | 0D | F3 | 2E | EC | 14 | D6 | 59 | CB |
| DA | 6D | A5 | 17 | D7 | 35 | EB | 40 | D5 | 47 | DD | 77 | F2 | 4D | E6 | 24 | E7 | 0D | C6 | 1B | E5 | 22 | FB | F6 |
| 39 | B1 | 6D | A8 | 1B | BE | 7B | E0 | 05 | D2 | 46 | FD | 12 | F6 | FD | EA | 21 | 84 | 5F | E9 | 2B | E1 | 18 | 52 |
| CA | 2C | F1 | 6D | B0 | 1B | 9E | 7E | A4 | 05 | B2 | 46 | F7 | 20 | F6 | 4D | 93 | 21 | F6 | 58 | ED | 2C | EA | F6 |
| 18 | AD | 33 | BB | 6D | C7 | 49 | 9E | 78 | 84 | 05 | F1 | 22 | A3 | 0C | 94 | 4F | E8 | 1C | F9 | 58 | EC | 2C | 18 |
| A3 | 65 | B2 | 37 | CF | 6D | AF | 3C | 9E | 75 | A3 | 05 | 55 | 0F | CC | 0E | C5 | 4F | E3 | 66 | F9 | 53 | F0 | E6 |
| 3E | CF | 65 | CF | 37 | B5 | D7 | D4 | 45 | 9E | 78 | 82 | B3 | A2 | 17 | A6 | 0E | 94 | 2F | EF | 66 | F6 | 54 | 2C |
| FA | 6E | CF | 65 | F7 | 37 | CD | 41 | F8 | 4B | 9E | 78 | B3 | 4E | 87 | 25 | CC | 0E | E6 | 1C | EF | 66 | FC | E8 |
|    |    |    |    |    |    |    |    |    |    |    |    |    |    |    |    |    |    |    |    |    |    |    | 56 |
| 1 to 64 | | | | | | 65 to 128 | | | | | | 129 to 192 | | | | | | 193 to 256 | | | | | |

Figure 3:
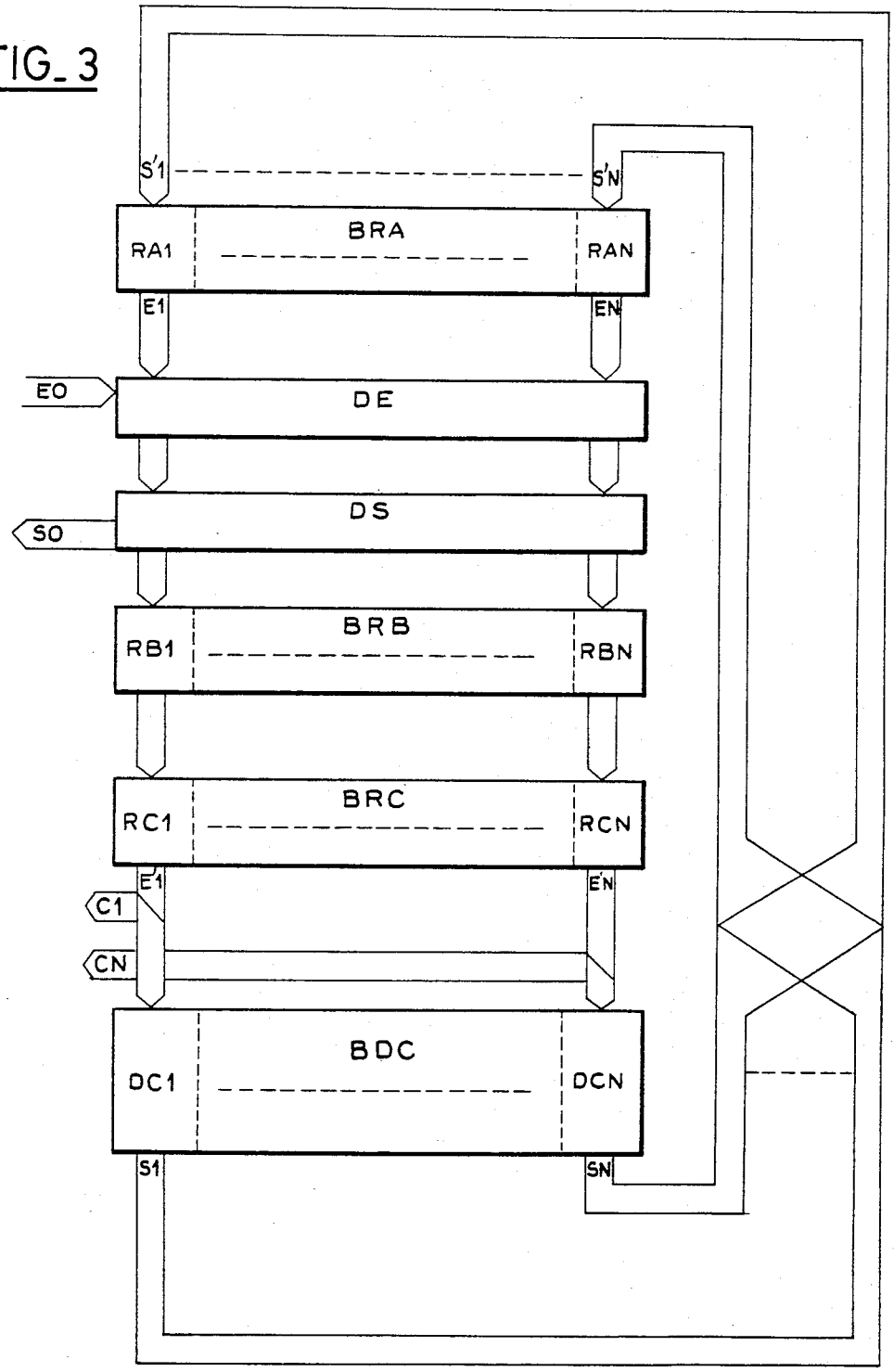
FIG. 3 illustrates the principle of the invention applied to three blocks of registers in order to detect sequential faults of order 2.

FIG. 3 illustrates an example of an application that consists of three blocks of registers and of one block of combinational devices.

At the start of each clock timing pulse, two of the blocks of registers contain test bits and these test bits therefore form two sets that are totally separate passing through loop BRA-BRB-BRC-BDC-BRA, the third set consisting of process bits.

Input device DC only allows input of data during one clock pulse out of three, when BRA contains process bits.

An advantageous property resides in the ability ot perform a test of sequential faults of registers and combinational devices. The combinational functions and the likes between BDC and BRA are selected so as to allow each of the sets of test bits to dynamize the registers and combinational devices, one of the dynamizations being partially redundant so that the respective clock pulse numbers P1 and P2 of these dynamizations are incommensurable numbers.

The successions of binary values taken by the two sets of test bits thus cover all the possible successions of two binary batches for each register and combinational device in at most PI×P2 process clock pulses.

Figure 4:
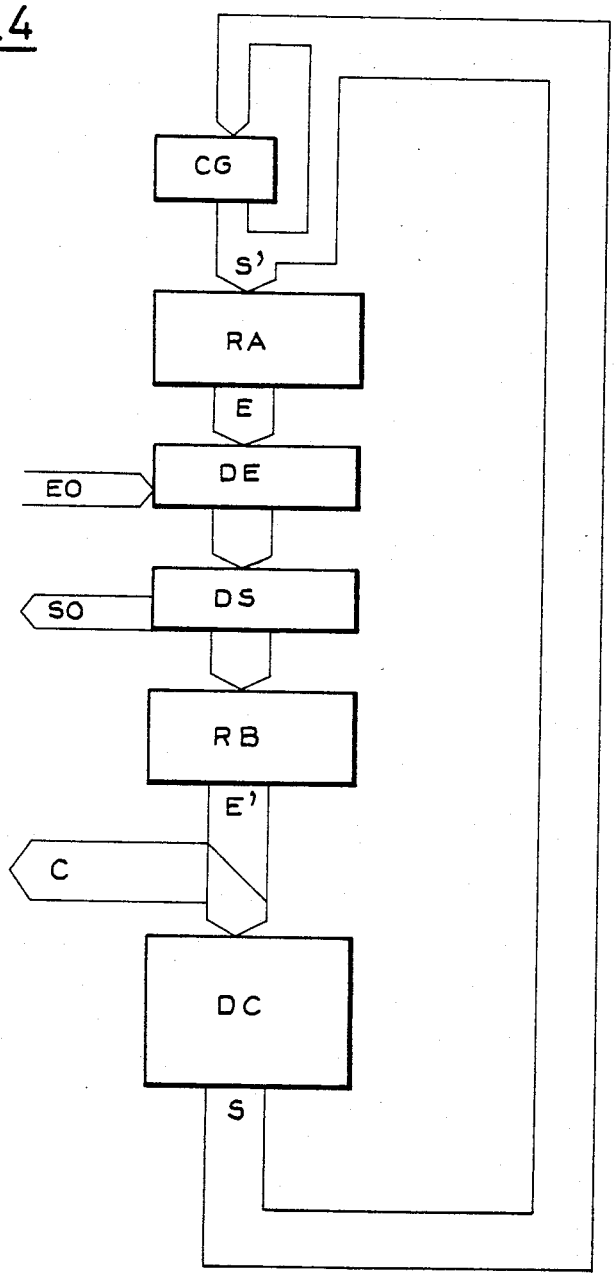
FIG. 4 illustrates the principle of the invention applied to only one combinational device and two registers.

FIG. 4 illustrates another application of the invention consisting of one only combinational device N and two registers RA and RB.

It is not possible, in this case, to render the graph (E')×(S') bijective by crossing the wires of S.

A correction device CG is used in this case, designed to oblige certain wires of S to render the graph (E')×(S') bijective, still in the same way. The method of Pétri networks provides a means of determining these wires as long as the combinational function is not excessively surjective.

CG is synchronized with the passage of the batch of test bits and dots not modify it.

It moreover goes without saying that the invention is not limited to the methods of realization illustrated and described and that a number of modifications may be made to it without leaving the scope of the present invention.

We claim:

1. A controller of the type including a pair of subcontrollers and a comparator facility operating on outputs from the two subcontrollers, said controller comprising, in combination:
   (I) a pair of said subcontrollers, each of said subcontrollers being identical when containing no faults and comprising:
      (1) at least two blocks of parallel registers;
      (2) at least one block of parallel combinational units for providing predetermined operations on signals transmitted to the inputs of said combinational units;
      (3) an output device for providing an output signal;
      (4) an input device, (a) having an input for receiving an input signal to said subcontroller and (b) coupled between the output of one of said blocks and devices and the input of another one of said blocks and devices, for selectively transmitting (i) the signal as received from said output of said one of said blocks and devices, unmodified by said input signal, to said input of said another one of said blocks and devices, and (ii) the signal received from said output of said one of said blocks and devices, modified by said input signal, to said input of said another one of said blocks and devices;

wherein (a) said blocks and devices of said subcontroller are coupled to one another so that the output of each of said blocks and devices is coupled in series to the input of another of said blocks and devices so as to form a shifting loop, (b) at least one set of test bits moves cyclically through said shifting loop, without being modified by said input signals, the values of the test bits being modified only by said combinational units, (c) said test bits dynamize all of said registers and combinational units successively and cyclically through a testing cycle so as to provide every possible logic value at the respective inputs of said registers and units and output signals from said output device such that a no-fault condition of said sub-controllers is indicated when output signals of said two sub-controllers are identical during a testing cycle; and (II) comparator means for comparing said output signals from said subcontrollers so as to detect differences in said output signals representative of faults in one of said subcontrollers.

2. A controller according to claim 1, wherein said first and second blocks of registers, said block of combinational units and said input device are coupled to one another so that said input device alternately transmits (i) the signal received from said output of said one of said blocks and device, unmodified by said input signal and (ii) the signal received from said output of said one of said blocks and devices, modified by said input signal, so as to alternately transmit to said combinational units test bits and process bits.

3. A controller according to claim 2, wherein each of said subcontrollers include a correction device coupled to said block of combination units for forcing certain output bits from said combinational units when the latter receives said test bits so as to render the output function of said combination units bijective.

4. A controller according to claim 1, wherein each of said subcontrollers includes a third block of parallel registers, said third block being coupled to said first and second blocks of registers, said block of combinational units, said input device and said output device so as to form a part of said shifting loop, said blocks and devices being coupled in series to one another so that said input device successively transmits, (i) the signal received from said output of said one of said blocks and devices, modified by said input signal, (ii) the signal received from said output of said one of said blocks and devices, unmodified by said input signals, and (iii) the signal received from said output of said one of said blocks and devices unmodified by said input signal, so as to successively transmit to said combinational unit a set of process bits, a set of test bits and a second set of test bits, the respective numbers of clock pulses for one complete dynamication cycle for each of said sets of test bits being incommensurable numbers so that said combinational unit successively receives every sequential combination of two logical states of the said two sets of test bits.

* * * * *